US010717011B2

(12) United States Patent
Lukinich et al.

(10) Patent No.: US 10,717,011 B2
(45) Date of Patent: Jul. 21, 2020

(54) READ REDIRECTION OF PHYSICAL MEDIA

(75) Inventors: Paul J. Lukinich, Kirkland, WA (US);
Paul S. Hellyar, Redmond, WA (US);
Michael Courage, Kirkland, WA (US);
Jerry Hook, Bothell, WA (US); Tracy Sharpe, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2538 days.

(21) Appl. No.: 11/949,662

(22) Filed: Dec. 3, 2007

(65) Prior Publication Data
US 2009/0143145 A1 Jun. 4, 2009

(51) Int. Cl.
*A63F 13/95* (2014.01)
*A63F 13/77* (2014.01)

(52) U.S. Cl.
CPC .............. *A63F 13/95* (2014.09); *A63F 13/77* (2014.09); *A63F 2300/206* (2013.01); *A63F 2300/209* (2013.01); *A63F 2300/53* (2013.01); *A63F 2300/532* (2013.01)

(58) Field of Classification Search
CPC ..................................................... G06F 12/06
USPC ............................................................ 463/43
See application file for complete search history.

(56) References Cited

U.S. PATENT DOCUMENTS

| | | | |
|---|---|---|---|
| 5,640,560 A | 6/1997 | Smith | 707/104.1 |
| 6,884,171 B2 | 4/2005 | Eck et al. | 463/42 |
| 7,209,892 B1 | 4/2007 | Galuten et al. | 705/26 |
| 2002/0045484 A1* | 4/2002 | Eck et al. | 463/42 |
| 2002/0147840 A1 | 10/2002 | Mutton et al. | 709/239 |
| 2003/0014496 A1 | 1/2003 | Spencer et al. | 709/217 |
| 2004/0259633 A1* | 12/2004 | Gentles | G07F 17/32 463/29 |

(Continued)

FOREIGN PATENT DOCUMENTS

| | | |
|---|---|---|
| WO | WO 00/10071 | 2/2000 |
| WO | WO 00/72574 | 11/2000 |

OTHER PUBLICATIONS

Youtube-How Linux ISO files are created to download Linux Distros Uploaded by iLearnLinux Jul. 3, 2007 https://www.youtube.com/watch?v=i5pr7a2VCJo.*

(Continued)

*Primary Examiner* — Tramar Y Harper
*Assistant Examiner* — Jeffrey K Wong
(74) *Attorney, Agent, or Firm* — Alleman Hall Creasman & Tuttle LLP

(57) ABSTRACT

Redirection of physical media interaction is disclosed. For instance, a read action can be redirected from an optical disc to a secure virtualization module that virtualizes optical discs. The module can take digital packages in one format and present them to optical disc drivers configured to read the content of such packages in a different format. Thus, the module allows for online media content to remain in its native format while being accessible to existing native gaming console resources configured to read content in a different format. In other aspects, the module can perform various security checks on the packages, including hashing the fragments of packages, where such fragments can contain licensing provisions that can be examined by the module. The module itself can be downloaded and installed onto a gaming system or it can be pre-installed.

18 Claims, 8 Drawing Sheets

(56) References Cited

U.S. PATENT DOCUMENTS

| | | | |
|---|---|---|---|
| 2005/0235047 A1 | 10/2005 | Li et al. | 709/219 |
| 2005/0262254 A1 | 11/2005 | Sherwani | 709/231 |
| 2006/0047974 A1 | 3/2006 | Alpem et al. | 713/191 |
| 2006/0281556 A1* | 12/2006 | Solomon | A63F 13/12 463/43 |
| 2007/0067362 A1* | 3/2007 | McArdle | G06F 17/30073 |
| 2008/0165176 A1* | 7/2008 | Archer | A63F 13/02 345/213 |
| 2008/0221859 A1* | 9/2008 | Van Geel | G06F 3/0607 703/24 |
| 2010/0248823 A1* | 9/2010 | Smith | 463/29 |
| 2012/0221318 A1* | 8/2012 | Shimizu | A63F 13/73 703/23 |

OTHER PUBLICATIONS

How to mount the Halo ISO with daemon tools Uploaded by dragonmasteremesto Nov. 6, 2007 https://www.youtube.com/watch?v=4LSSh36Wy4c.*

How to burn or write a CD/DVD image or ISO Lawrence Abrams Nov. 17, 2005 https://www.bleepingcomputer.com/tutorials/write-a-cd-dvd-image-or-iso/.*

Virtual CDs and ISOs—Run DVDs without a DVD Drive Upladed by Jimmy Ruska Apr. 18, 2007 https://www.youtube.com/watch?v=j3nbZoQOdNU.*

Stickler, P., "Metia—A Generalized Metadata Driven Framework for the Management and Distribution of Electronic Media," *Proc. Int'l Conf. on Dublin Core and Metadata Applications, NII*, Tokyo, Japan, Oct. 24-26, 2001, 235-241.

\* cited by examiner

READ REDIRECTION OF PHYSICAL MEDIA

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2007 Microsoft Corp.

FIELD OF TECHNOLOGY

The presently disclosed subject matter relates to the field of computing, and more particularly, to fields such as gaming and media content, although these are merely exemplary and non-limiting fields.

BACKGROUND OF THE INVENTION

Media content for gaming consoles is typically optimized around reading from physical media, such as DVDs. For example, one type of media content may include gaming content. When such gaming content is packaged for digital distribution, unless it is in the appropriate physical media format, it will not run correctly. Yet, when digitally distributing such gaming content it may not always be feasible nor desirable to package such content in any one particular format, such as DVD format.

Thus, there is a need in the art for the digital distribution of media content that can be packaged in any desired format, and yet when being installed on a gaming console, have the ability to play such content using the native gaming console resources—which may be configured to play content in a different format from the packaged format.

SUMMARY OF THE INVENTION

Various mechanisms are disclosed herein for redirecting the reading of physical media. For example, a read action can be redirected from an optical disc to a module that virtualizes optical discs. The module can present the content of digital data packages to optical disk drivers in a format understood by such drivers. The packages can be obtained from remote online stores in a format that stores the content in a different format from any typical disc format.

In other aspects of the presently disclosed subject matter, the module can perform various security checks on the packages, including hashing the fragments of packages and performing hashes of hashes. In still other aspects, the fragments can contain licensing provisions that can be examined by the module. The module itself can be downloaded and installed onto a gaming system or it can be pre-installed.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Figure 1:
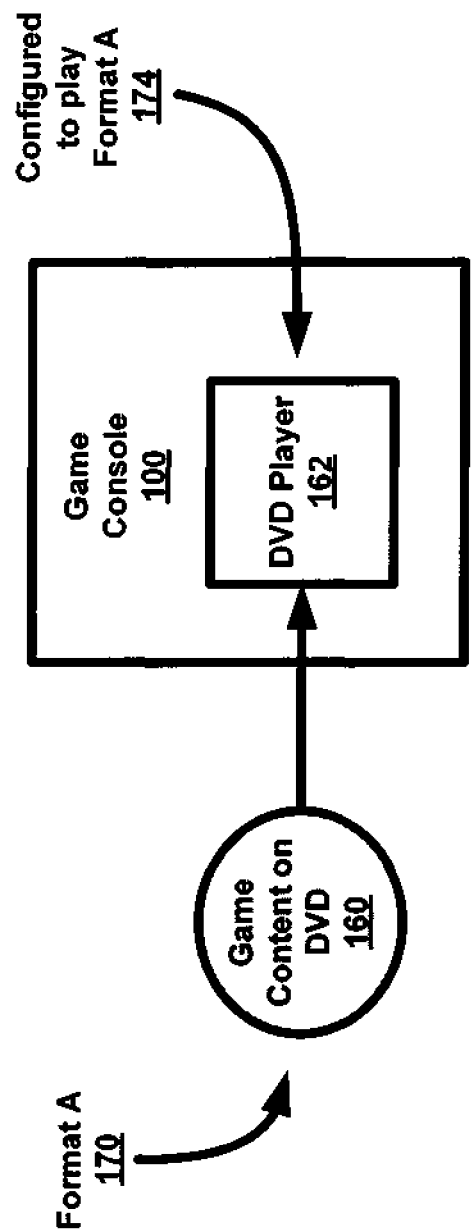
FIG. 1 illustrates a prior art system where media content, such as game content, is provided on optical disc media, such as DVDs.

FIG. 1 illustrates a prior art system where media content, such as game content, is provided on optical disc media, such as DVDs. In this system, users buy a game DVD 160 and play it on a game console 100. The DVD player 162 portion of the game console 100 is configured to play such DVDs, which may be written in a specific format 174. Since manufactures of the game console 100 can specify ahead of time to game developers the type of format that is expected by the game console 100, DVDs containing games can be formatted accordingly.

Figure 2:
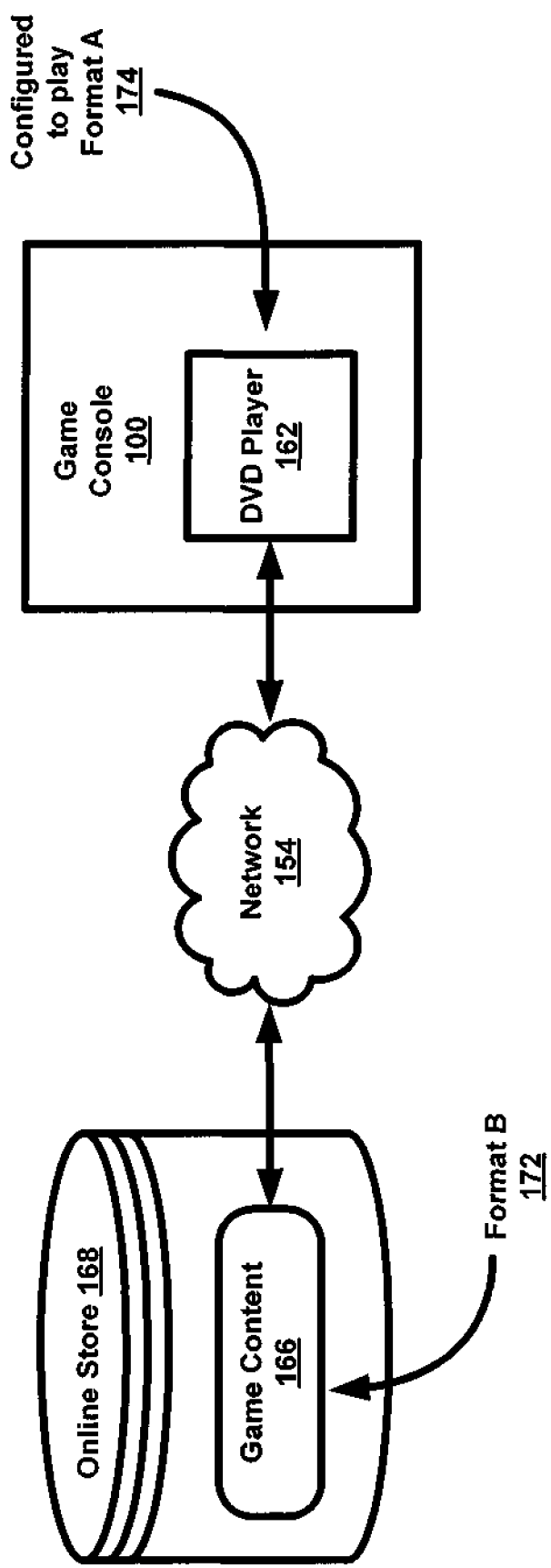
FIG. 2 illustrates one aspect of the disclosed subject matter where game content can be derived from an online store.

In contrast to FIG. 1, FIG. 2 illustrates one aspect of the disclosed subject matter where game content 166 can be derived from an online store 168. In this non-traditional scenario, the game content 166 can be downloaded via some network 154 and stored on the game console 100. The game content 166, however, may be arranged or saved in a format 172 that is different from the format 174 the DVD player 162 is used to playing—namely, a format it expects from a traditional DVD, as shown in FIG. 1.

One reason that the game content 166 may be arranged in a different format is that it may be saved using image files or some other such formats. In contrast, the traditional DVD 160 may store its content in a format that is amendable and most efficient for an optical disc, such as Universal Disk format, VC-1, H.264, MPEG-2, MPEG-4, and so on. Thus, according to FIG. 2, the game console 100 is able to play game content 166 which may be stored in a different or some proprietary format.

Figure 3:
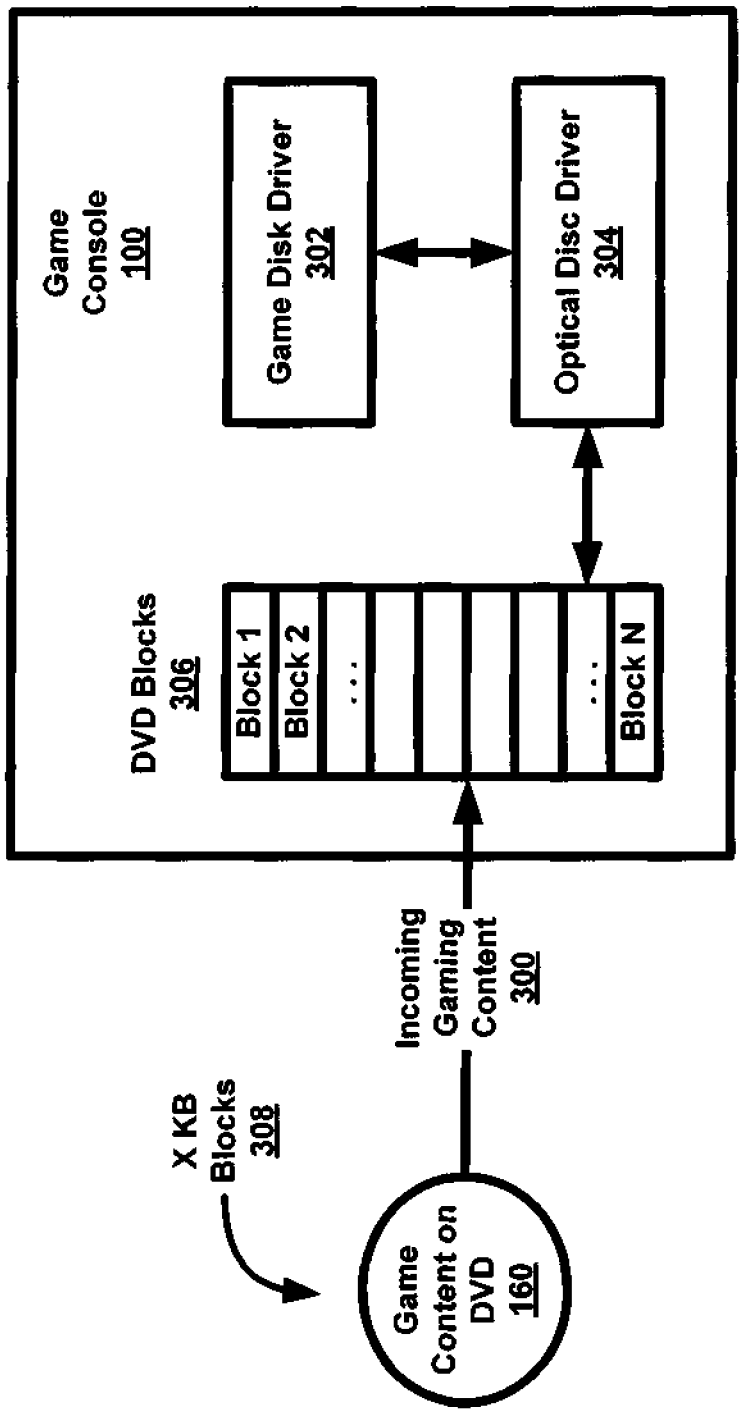
FIG. 3 illustrates a prior art system and how it obtains data from DVDs and stores such data in memory blocks.

Next, FIG. 3 illustrates a prior art system and how it obtains data from DVDs and stores such data in memory blocks. According to FIG. 3, game content on a DVD 160 or some other such equivalent storage medium, is read and stored at the game console 100, for example, in console memory 306. This media content 160 can then be read by an optical disc driver 304 that understands the format of the content, and the results of this read can be provided to a game disk driver in order for the game to execute and be played by users.

Figure 4:
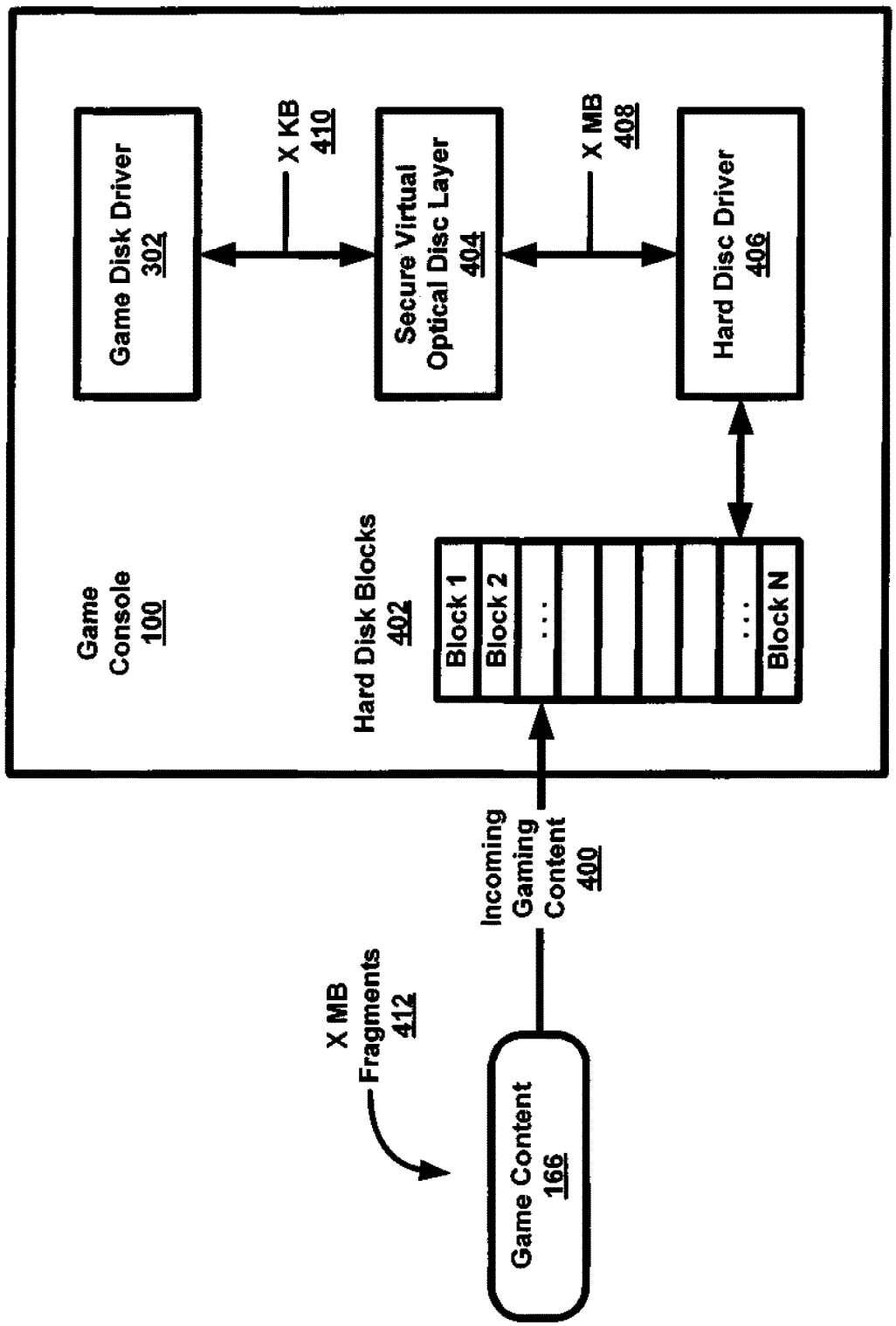
FIG. 4, in contrast to FIG. 3, illustrates how an online obtained game content is stored, read, and processed.

The traditional setup in FIG. 3 provides a stark contrast to FIG. 4, which illustrates how an online obtained game content 166 is stored, read, and provided for execution. In order to allow for the online originated game content to execute, a secure virtual optical disc layer 404 is used. This layer can interface with a hard disc driver 406 which can read any stored online derived content from hard disk blocks 402.

The content can be stored on the hard disk in units of megabytes (MBs), for example (although other unites are contemplated herein, including kilobytes (KBs), gigabytes (GBs), and so on). The content stored in this format 408 can then be provided by the hard disc driver 406 and received by the secure layer 404. The secure layer 404 can take this content and emulate it into the format expected by the game disc driver 302. The game disc driver 302 expects content from an optical disc, and the secure layer 404 can present this content in the expected format. Thus, the net effect is that an otherwise normal content read from an optical disc is redirected to a read from packaged online derived content, where the content is translated from a packaged format to a disk driver understandable format by a secure virtual layer 404. Moreover, this feat is accomplished without having to download the game content 166 in optical disc format.

In one aspect of the presently disclosed subject matter, a data volume manipulated by the secure layer 404 can be divided into a set of fragments. These fragments can be files in a FATX file system on a hard drive. All the fragments except the last one can be the same size, for instance, about 160 MB (although other sizes of different magnitudes are also contemplated herein). The fragments themselves can be divided into fixed size blocks, for instance, 4 KB (although, again, other sizes and/or magnitudes are also contemplated herein). Each block can contain either hashes or data. Thus, broadly speaking, satisfying a read for a block can be a matter of determining the appropriate block in the appropriate fragment.

In another aspect of the presently disclosed subject matter, for every couple hundred data blocks, there can be a level zero (L0) hash block that contains a 20 byte hash for each of the data blocks (although hashes of other size and magnitude are also contemplated herein). For every couple hundred L0 blocks there can be an L1 block that can contain hashes for the L0 blocks. A fragment file can contain one L1 block at the front followed by a set of interleaved L0 blocks and data blocks. Each L0 block can be followed by the data blocks it describes.

By way of example and not limitation, the process of reading a single block can be illustrated in the following manner (even though a single read request may span multiple blocks and multiple fragments; and, for the following description, it is assumed that every block is handled separately, but the secure layer 404 can batch reads when it's efficient to do so): When the secure layer 404 is asked for data, the result is that a byte offset into the secure layer volume is requested. This offset can be divided by the block size to give a data block number. To read this block, the secure layer 404 can read in several "backing blocks" from the underlying FATX fragment files. "Backing blocks" can be the data block and associated L0 and L1 hash blocks. To read these in, backing block numbers for the data block can be computed—L0 hash block and L1 hash block. This computation can be derived from the file format described above. Basically, it has to be determined how much space was consumed by the hashes for all the data preceding the things actually requested. Once the backing block numbers for all the backing blocks to be read are obtained, the following can occur: division of the backing block number by the fragment size (in blocks) to figure out which fragment file to read and then a modulus computation can be performed to figure out the offset in that file. This, however, is merely one exemplary and non-limiting aspect of the presently disclosed subject matter.

Figure 5:
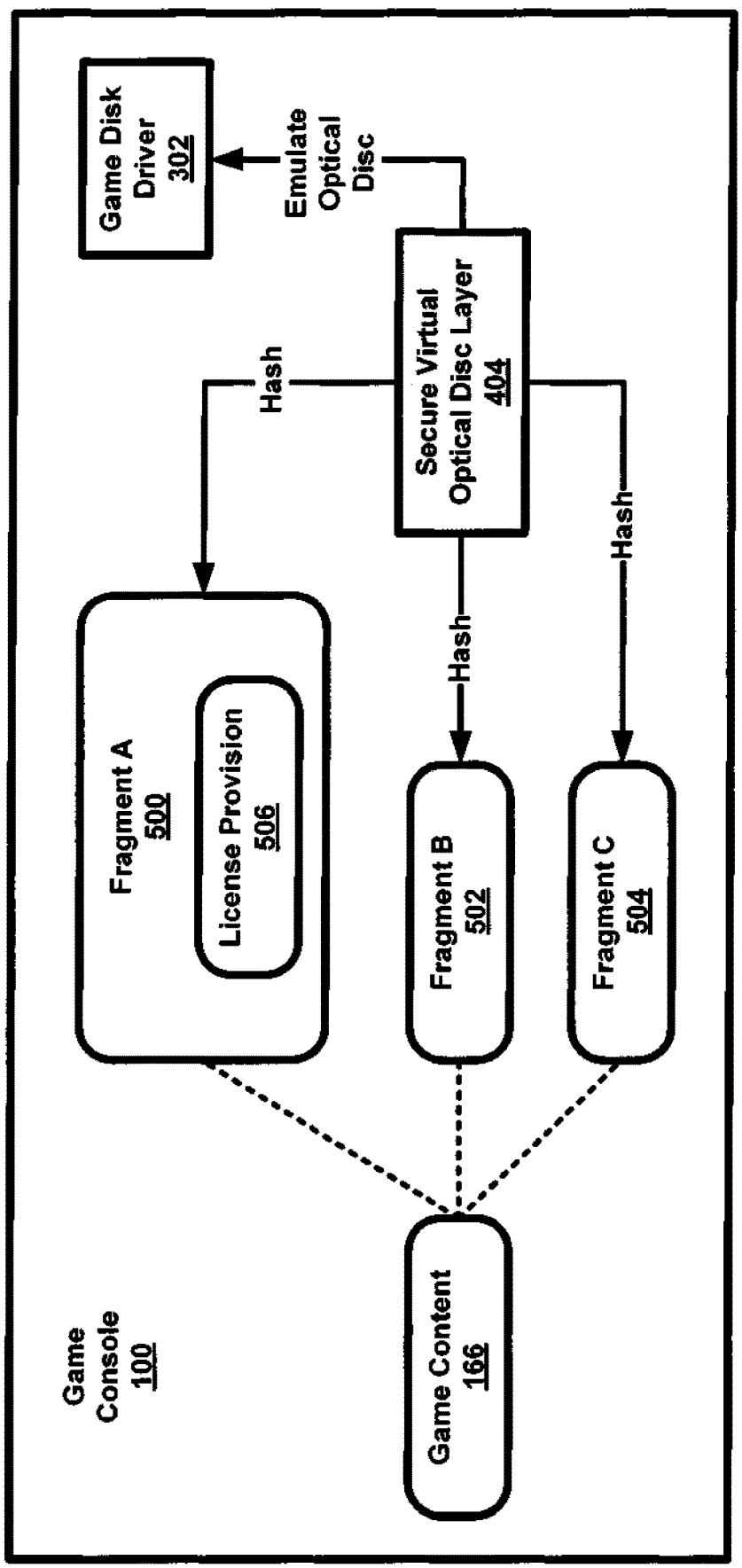
FIG. 5 illustrates in more detail various aspects of the online game content and how the secure virtual layer interacts therewith.

FIG. 5 illustrates in more detail various aspects of the online game content and how the secure virtual layer interacts therewith. Specifically, game content 166 can comprise of a plurality of fragments A 500, B 502, and C 504. Such fragments can contain a plurality of licensing provisions. For example, fragment A 500 can contain a license provision 506 to ensures such content fragment is properly licensed. Furthermore, each of such fragments 500, 502, 504 can be hashed for security purposes by the secure virtual layer 404.

The hashing, moreover, can be hierarchical in that a hash of hashes can be performed to arrive at one (or a small subset) of hashing numbers, thereby allowing for quick and efficient authentication of the fragments A 500, B 502, C 504. It should be noted that the game content 166 may comprise of a plurality of fragments and such game content may typically derive from one online source; however, in other aspects of the presently disclosed subject matter, it is contemplated herein that the shown fragments A 500, B 502, and C 504 may derive from disparate remote sources to together make up the game content 166. In any event, the game content 166 may eventually be stored and accessed by the secure virtual layer 404 via drivers and other components.

Figure 6:
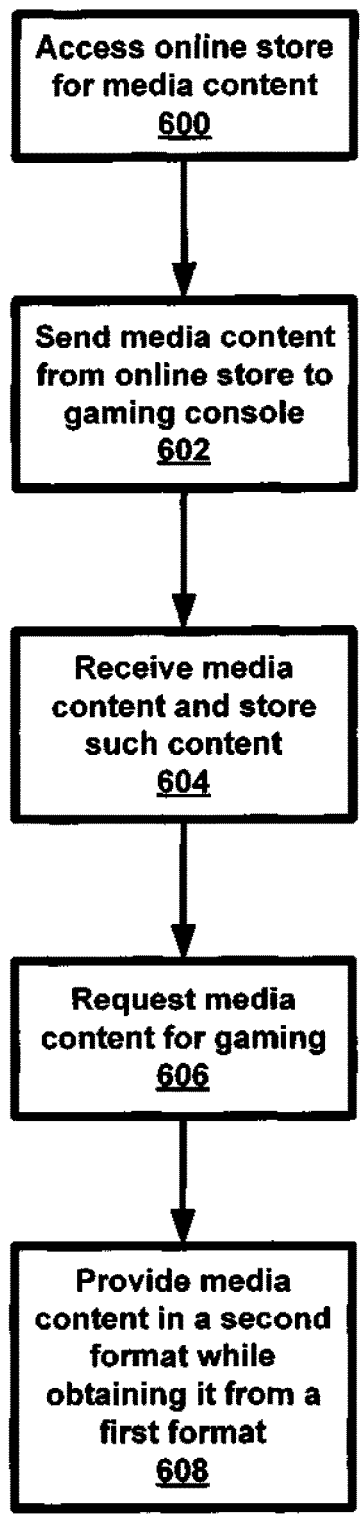
FIG. 6 illustrates one exemplary and non-limiting process associated with the presently disclosed subject matter.

FIG. 6 illustrates one exemplary and non-limiting process associated with the presently disclosed subject matter. At block 600, a user of a gaming console can access an online store for media content. Alternatively, if the user subscribes to a server associated with the gaming console, updates can be sent automatically to the gaming console or upon request. In any event, once an access request is made, at block 602, media content is sent form the online store to the console. It should be noted that media content can include not only games, but also songs, movies, and/or pictures (basically, any digital content).

At block 604, the sent media content can be received by the gaming console and stored. Any digital packages containing such content can comprise of a plurality of fragments discussed above. As was mentioned above, such fragments can be stored in a different format than the format that is expected by the native gaming console resources.

Then, at block 606, such stored media content can be requested by execution modules. To address such requests, at block 608, the stored media content, which can be arranged in a first format, can be presented to the execution modules in a second format. Again, by way of example only, the first format can be used for storing data on optical discs, i.e., it can be amendable to optical disc storage requirements, and the second format can be amendable to storing data in packages to be send via networks, for instance, to remote locations. Moreover, the first format can be at least one order of magnitude larger than the second format, for instance, MB versus KB, or GB versus MB. In short, the two formats can be divided into packets of different sizes and arrangements.

In one exemplary and non-limiting aspect of the present disclosure, a module at the gaming console can receive data in a first format from a driver configured to access hard disc blocks that are storing downloaded online content. This module can then convert any data retrieved from the hard disc (or at least any portion thereof) to a second format that is then readable by game disc drivers. As far as the game disc drivers are concerned, it appears as if the data is being read from optical discs, since it is presented to the drivers by the module as optical disc data. Thus, in a sense, the module, which may be a secure and virtualizing module, emulates the stored data and presents it to the drivers as optical disc data. This allows for use of existing hardware and software for online derived content, where in the past the gaming console could only play optical disc content.

The secure and virtualizing module in question can be downloaded from remote locations by the gaming console, thereby allowing legacy gaming consoles to play online content. Of course, it is contemplated herein that some gaming consoles will already have such modules pre-installed. Once such modules are running, they can perform a host of other tasks, such as checking for licenses in the online derived content; they can perform security checks using, for instance, hashing algorithms, and so on.

In one aspect of the presently disclosed subject matter, when an online derived game is turned on to be played on the gaming console, the default read-from-an-optical-disc functionality can be redirected to the secure and virtualizing module. This module, in turn, can start presenting data to any game drivers in the arrangement that is expected by the drivers—regardless of the underlying arrangement of the data.

Thus, because the online derived data is stored in a format configured to be transmitted over networks, such games can be shared among a plurality of consoles, whether in a peer-to-peer scheme or client-server scheme. In the former scenario, various friends can freely share such online content; in the latter scenario, a central marketplace server can mediate any exchange of content.

III. Exemplary Computing Devices and Networks for Online Content

Figure 7:
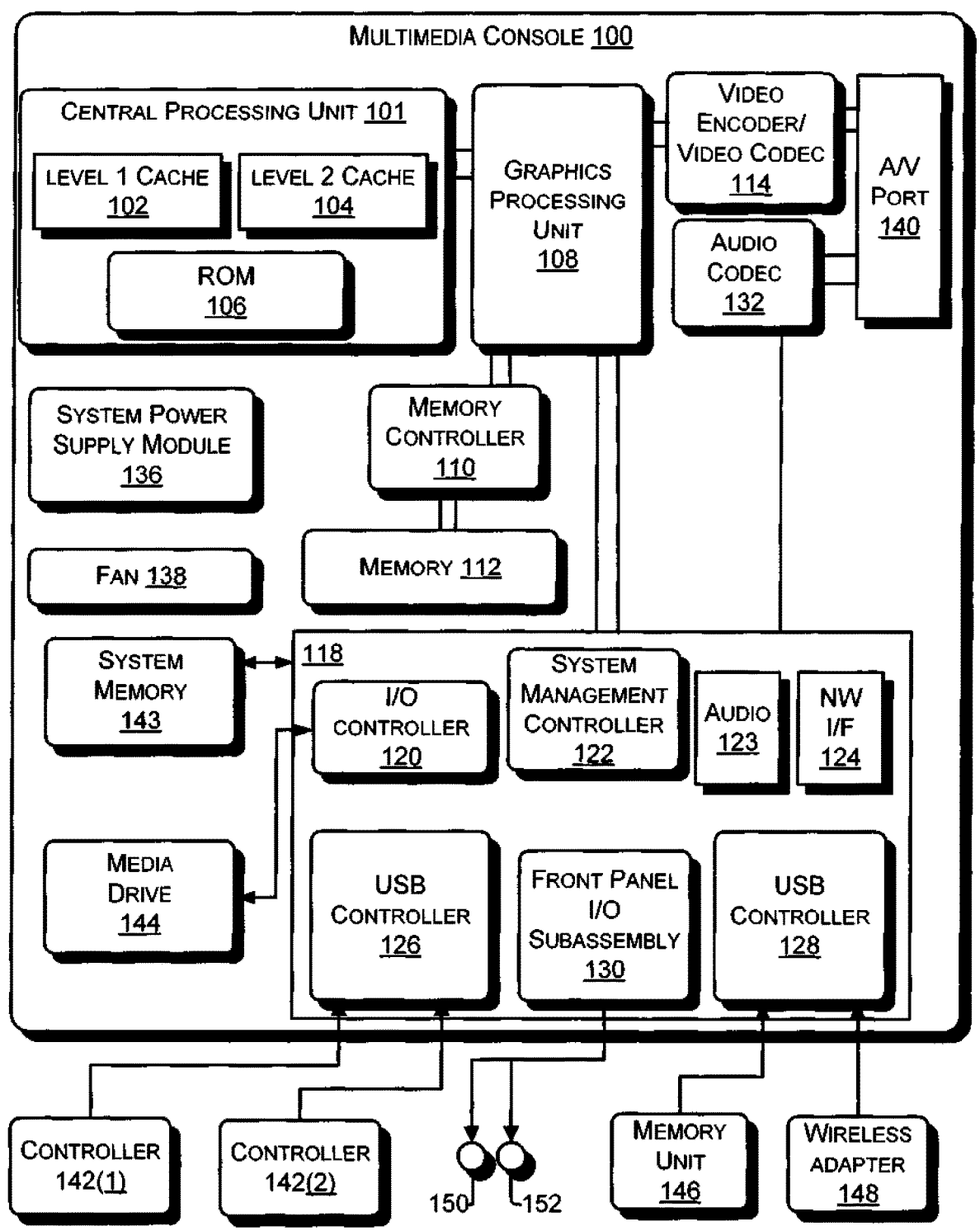
FIG. 7 illustrates a block diagram of an exemplary multimedia console, whether a game oriented console or a general personal computer (PC), that can be used with the aspects discussed with reference to FIGS. 1-6.

Gaming consoles can be used to store online derived content, but it is understood that gaming consoles correspond to merely exemplary and non-limiting computing devices. Contemplated herein are also hand-held devices, laptops, general personal computers (PCs), and so on. Referring to FIG. 7, a block diagram shows an exemplary multimedia console, which includes a game oriented console or a PC. For example, digital audio processing may be implemented in the multimedia console 100. The multimedia console 100 can have a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase can be stored in a flash memory device (not shown). Further, ROM 106 can be located separately from the CPU 101.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory).

The multimedia console 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 can provide access to a network (e.g., the Internet, home network, etc.) and may be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 can be connected to the I/O controller 120 via a bus, such as a Serial ATA bus or other high speed connection (e.g., IEEE 1394).

The system management controller 122 can provide a variety of service functions related to assure the availability of the multimedia console 100. The audio processing unit 123 and an audio codec 132 can form a corresponding audio processing pipeline with high fidelity, 3D, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the multimedia console 100. A system power supply module 136 can provide power to the components of the multimedia console 100. A fan 138 can cool the circuitry within the multimedia console 100.

The CPU 101, GPU 108, memory controller 110, and various other components within the multimedia console 100 can be interconnected via one or more buses, including serial and parallel buses, a memory bus, a peripheral bus, and a processor or local bus using any of a variety of bus architectures.

When the multimedia console 100 is powered on or rebooted, application data can be loaded from the system memory 143 into memory 112 and/or caches 102, 104 and executed on the CPU 101. Such application data can include some of the online derived data. The application may also present a graphical user interface that provides a consistent user experience when navigating to different media types available on the multimedia console 100. In operation, applications and/or other media contained within the media drive 144 can be launched or played from the media drive 144 to provide additional functionalities to the multimedia console 100.

The multimedia console 100 may be operated as a stand-alone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. As such a participant, it may interact with computing devices, whether PCs or servers, and receive information that may be eventually stored.

Figure 8:
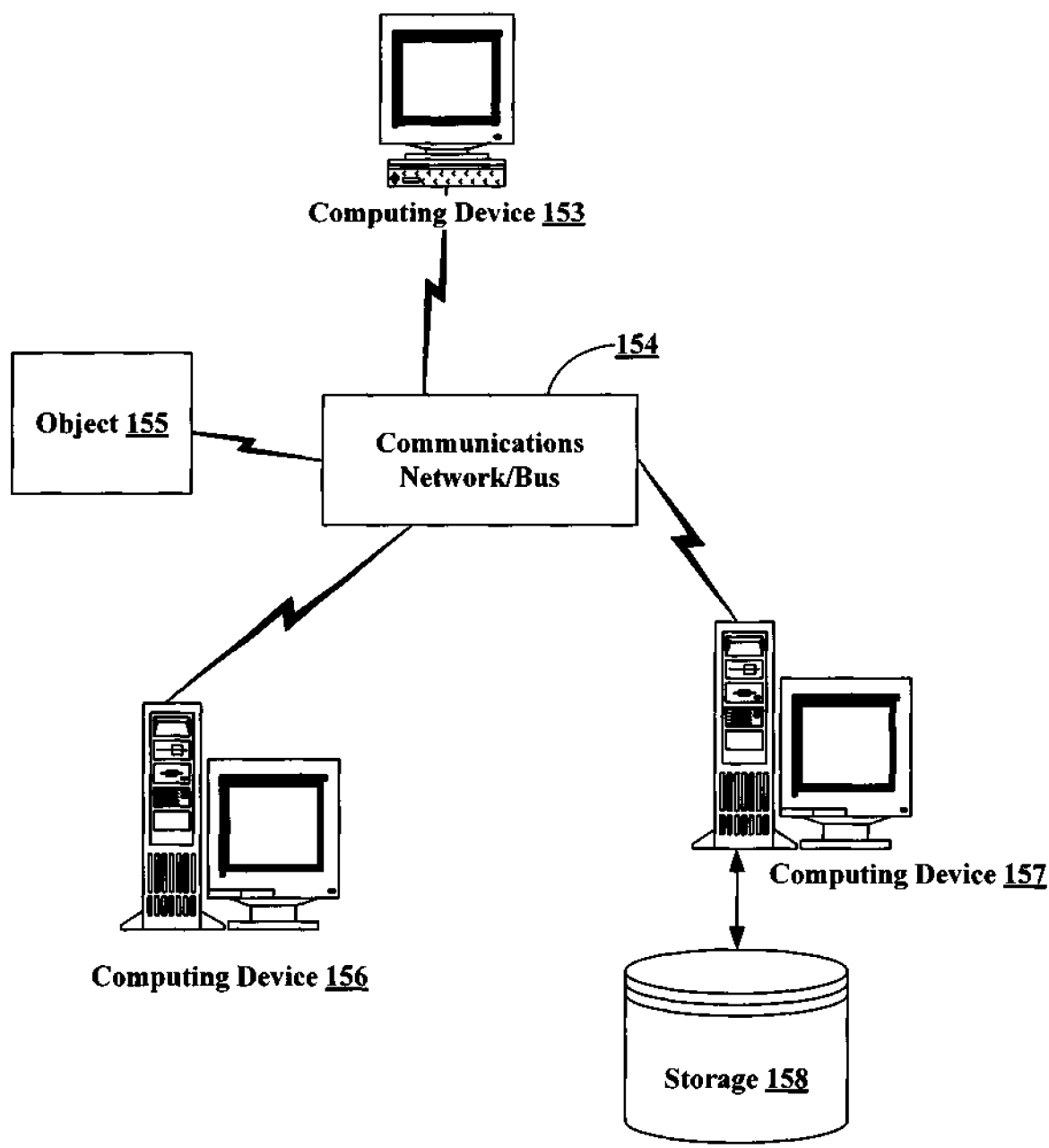
FIG. 8 illustrates an exemplary networking environment for subject matter discussed with reference to FIGS. 1-7.

For example, FIG. 8 illustrates an exemplary networking environment for subject matter discussed with reference to FIGS. 1-7. The above discussed gaming console 100 can correspond to any one of the computing devices 153, 156, 157, or it can be distributed over such devices 153, 156, 157. It can interact with various other objects 155 and storage devices 158 via a communications network/bus 154, where such objects and devices can correspond to other computing devices (whether hardware, firmware, or software).

Finally, it should also be noted that the various techniques described herein may be implemented in connection with hardware or software or, where appropriate, with a combination of both. Thus, the methods and apparatus of the presently disclosed subject matter, or certain aspects or portions thereof, can take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined.

Lastly, while the present disclosure has been described in connection with a plurality of exemplary aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for redirecting reads from optical media to digital packages. However, other equivalent mechanisms to these described aspects are also contemplated by the teachings herein. Therefore, the present disclosure should not be limited to any single aspect, but rather construed in breadth and scope in accordance with the appended claims.

What is claimed:

1. An apparatus comprising:
    an optical disc drive;
    a storage device;
    a processor; and
    memory coupled to the processor, the memory comprising executable instructions that when executed by the processor cause the processor to effectuate operations comprising:
        when receiving game data formatted in a first format via a network, wherein the first format is not an optical disc format and comprises a set of fragments of the game data, each fragment comprising data blocks, the data blocks comprising hash data blocks and game data blocks,
        storing on the storage device the game data formatted in the first format,
        upon receiving a request to execute the game data, accessing the game data formatted in the first format stored on the storage device via a secure virtual optical disc layer of the apparatus,
        emulating, via the secure virtual optical disc layer of the apparatus, the game data formatted in the first format into game data formatted in a second format, the second format being compatible with a disc driver of the apparatus configured to read data via the optical disc drive, and
        providing emulated game data formatted in the second format to the disc driver; and
        when receiving game data formatted in the second format via the optical disc drive, providing the game data formatted in the second format from the optical disc drive to the disc driver of the apparatus.

2. The apparatus of claim 1, wherein said second format is the optical disc format that is amenable to optical disc storage.

3. The apparatus of claim 2, wherein said first format is a file image format.

4. The apparatus of claim 1, the operations further comprising:
    hashing at least a portion of the game data formatted in the first format.

5. The apparatus of claim 1, the operations further comprising:
    checking for a license prior to the emulating.

6. A method comprising:
    when receiving, by a device, game data formatted in a first format via a network, wherein the first format is not an optical disc format, and wherein the first format comprises a set of fragments of the game data, each fragment comprising data blocks, the data blocks comprising hash data blocks and game data blocks,
    storing on a storage device of the device the game data formatted in the first format,
    upon receiving a request to execute the game data, accessing the game data formatted in the first format stored on the storage device via a secure virtual optical disc layer of the device,
    emulating, via the secure virtual optical disc layer of the device, the game data formatted in the first format into game data formatted in a second format, the second format being compatible with a disc driver of the device configured to read data via an optical disc drive of the device, and
    providing emulated game data formatted in the second format to the disc driver; and
    when receiving game data formatted in the second format via the optical disc drive, providing the game data formatted in the second format from the optical disc drive to the disc driver of the device.

7. The method of claim 6, wherein the game data formatted in the first format is at least one order of magnitude larger than the game data formatted in the second format.

8. The method of claim 6, wherein the second format is the optical disc format that is amenable to optical disc storage.

9. The method of claim 6, further comprising:
checking for at least one license prior to the emulating.

10. The method of claim 6, further comprising:
hashing at least a portion of the game data formatted in the first format.

11. The method of claim 6, further comprising:
redirecting a read request to an optical data disc to the secure virtual optical disc layer.

12. A computer-readable storage medium that is not a transient signal, the computer-readable storage medium comprising executable instructions that when executed by a processor cause the processor to effectuate operations comprising:
when receiving, by an apparatus, game data formatted in a first format via a network, wherein the first format is not an optical disc format and comprises a set of fragments of the game data, each fragment comprising data blocks, the data blocks comprising hash data blocks and game data blocks,
storing on a storage device of the apparatus the game data formatted in the first format,
upon receiving a request to execute the game data, accessing the game data formatted in the first format stored on the storage device via a secure virtual optical layer of the apparatus,
emulating, via the secure virtual optical disc layer of the apparatus, the game data formatted in the first format into game data formatted in a second format, the second format being compatible with a disc driver of the apparatus configured to read data via an optical disc drive of the apparatus, and
providing emulated game data formatted in the second format to the disc driver; and
when receiving, by the apparatus, game data formatted in the second format via the optical disc drive, providing the game data formatted in the second format from the optical disc drive to the disc driver of the apparatus.

13. The computer readable storage medium of claim 12, the operations further comprising:
performing a hash on at least a portion of the game data formatted in the first format.

14. The computer readable storage medium of claim 12, the operations further comprising:
checking for at least one license associated with the game data formatted in the first format received via the network prior to the emulating.

15. The computer readable storage medium of claim 12, wherein:
the second format is the optical disc format that is amenable to optical disc storage.

16. The computer readable storage medium of claim 12, wherein:
said first format is a file image format.

17. The computer readable storage medium of claim 12, the operations further comprising:
redirecting a read request to an optical data disc to the secure virtual optical disc layer.

18. The computer readable storage medium of claim 12, wherein the disc driver is an optical disc driver and the second format is optical disc data, and
wherein the first format comprises a set of data fragments that is different from the optical disc data that the optical disc driver is configured to read.

* * * * *